(12) United States Patent
 Pedersen

(10) Patent No.: US 8,814,976 B2
(45) Date of Patent: Aug. 26, 2014

(54) DISPERSIBLE SULPHUR FERTILIZER PELLETS

(75) Inventor: Eric Pedersen, Calgary (CA)

(73) Assignee: Sulvaris Inc., Calgary, Alberta (CA)

( * ) Notice: Subject to any disclaimer, the term of this patent is extended or adjusted under 35 U.S.C. 154(b) by 170 days.

(21) Appl. No.: 13/264,741

(22) PCT Filed: Apr. 16, 2010

(86) PCT No.: PCT/CA2010/000592
§ 371 (c)(1),
(2), (4) Date: Oct. 14, 2011

(87) PCT Pub. No.: WO2010/118532
PCT Pub. Date: Oct. 21, 2010

(65) Prior Publication Data
US 2012/0036906 A1    Feb. 16, 2012

Related U.S. Application Data

(60) Provisional application No. 61/169,956, filed on Apr. 16, 2009.

(30) Foreign Application Priority Data

Apr. 16, 2009   (CA) .................................. 2663119

(51) Int. Cl.
  *C05D 9/00*   (2006.01)
  *C05C 3/00*   (2006.01)
  *C05D 1/02*   (2006.01)
(52) U.S. Cl.
  CPC .. *C05D 1/02* (2013.01); *C05D 9/00* (2013.01); *C05C 3/00* (2013.01)
  USPC ............................................................ 71/31

(58) Field of Classification Search
  USPC ....................................................... 71/31–63
  See application file for complete search history.

(56) References Cited

U.S. PATENT DOCUMENTS

| | | | |
|---|---|---|---|
| 1,795,364 A | | 3/1931 | Ellis |
| 2,097,446 A | * | 11/1937 | Claiborne, Jr. et al. ........... 71/33 |
| 3,062,637 A | | 11/1962 | Marples et al. |
| 4,062,694 A | | 12/1977 | Sawyer, Jr. |
| 4,133,669 A | * | 1/1979 | Caldwell et al. ................... 71/54 |
| 4,372,872 A | * | 2/1983 | Backlund ......................... 516/96 |

(Continued)

FOREIGN PATENT DOCUMENTS

| DE | 1024934 | 2/1958 |
|---|---|---|
| DE | 1592609 | 2/1970 |

(Continued)

*Primary Examiner* — Wayne Langel
(74) *Attorney, Agent, or Firm* — Bennett Jones LLP

(57) ABSTRACT

A water dispersible pellet and method of producing same comprising: micronized elemental sulphur with 80% of particles less than 30 microns, a binder component in the amount ranging from 0.95% to 95% by weight; a surfactant in the amount ranging from 0.05% to 10% by weight; a soluble salt present in the amount ranging from 0.05% to 95% by weight; bentonite clay in the amount ranging from 0.05% to 95% by weight. The pellet having a mean particle domain size and a mean crushing strength, all in a form such that within a few minutes of contact with water the pellet disperses into particles with more than 10% of said particles passing through a 50 mesh (US Standard Size) screen.

38 Claims, 2 Drawing Sheets

(56) References Cited

U.S. PATENT DOCUMENTS

| | | |
|---|---|---|
| 4,394,150 A | 7/1983 | Garrison et al. |
| 4,487,624 A * | 12/1984 | Lalancette et al. ............. 71/32 |
| 4,569,859 A * | 2/1986 | Zaharko ..................... 427/215 |
| 5,599,373 A | 2/1997 | Zanuccoli |
| 7,530,196 B2 * | 5/2009 | Tidow et al. .................. 47/48.5 |
| 7,785,553 B2 * | 8/2010 | Taulbee ....................... 423/274 |
| 2001/0029762 A1 * | 10/2001 | Steele et al. ................... 71/63 |
| 2007/0119222 A1 * | 5/2007 | Valencia et al. ................. 71/52 |
| 2009/0013743 A1 * | 1/2009 | Lynch et al. .................... 71/17 |

FOREIGN PATENT DOCUMENTS

| | | |
|---|---|---|
| DE | 2601677 | 7/1977 |
| FR | 1511002 | 1/1968 |
| GB | 499807 | 1/1939 |
| WO | WO 90/03350 | * 4/1990 |
| WO | 9003350 | 5/1990 |
| WO | WO 2008/024007 | * 2/2008 |
| WO | 2008041132 | 4/2008 |
| WO | WO 2008/084495 | * 7/2008 |
| WO | 2010118532 | 10/2010 |

* cited by examiner

DISPERSIBLE SULPHUR FERTILIZER PELLETS

CROSS REFERENCE TO RELATED APPLICATIONS

This application is a National Phase entry of International Patent Application Serial No. PCT/CA2010/0000592 filed 16 Apr. 2010, and claims the benefit of priority of U.S. Provisional Patent Application No. 61/169,956 filed 16 Apr. 2009 and Canadian Patent Application No. 2,663,119 filed 16 Apr. 2009, which are hereby incorporates by reference.

The invention relates to elemental sulphur fertilizer, and more particularly, to compositions and methods for producing dispersible elemental sulphur fertilizer pellets.

BACKGROUND

It is generally known in agricultural sciences that sulphur fertilization increases crop yield and quality and further has a beneficial effect on nitrogen processing by plants. This nitrogen processing is in turn related to protein synthesis, cell replication, photosynthesis, and disease resistance.

However, more stringent air pollution regulations and the reduction of sulphur dioxide emissions have resulted in a greater incidence of sulphur deficiencies in agricultural soils, thereby increasing the demand for sulphur containing fertilizers.

Generally speaking, powdered sulphur has little utility as an agricultural fertilizer because of difficulty in handling, and the sulphur dust acts as an eye irritant. Sulphur dust also presents an explosive risk in handling facilities and segregates if blended with granular fertilizer products.

Accordingly, most agricultural fertilizers used in field applications are formulated into particles in order to alleviate these drawbacks. Particulate products can be easily handled without the generation of excessive dust and segregate less when blended with other particulate products.

Conventionally, sulphur has been applied in the form of elemental sulphur, ammonium sulfate, ammonium thiosulfate, ammonium bisulfate, sulfides or calcium sulfate (gypsum).

Due to the high analysis of elemental sulphur fertilizer products, they are more cost effective than sulfate products because of lower transportation, handling, and storage costs. High analysis fertilizer products also allow more flexibility when blending with other nutrient products. The main drawback of elemental sulphur products is that their oxidation to plant available sulphate is slow often taking many years from the time of application.

The effectiveness of elemental sulphur fertilizers depends on the rate of their oxidation to the plant-available sulfate form. In soil, oxidation to sulphate is a microbial process involving bacterial species such as *Thiobacillus*. The rate of this reaction is strongly influenced by soil and environmental factors as well as the physical and chemical properties of the fertilizer product. Sulphur oxidation is generally a surface reaction. Thus, the amount of sulphate produced per unit of time is a function of the total surface area of elemental sulphur present, not of its mass, hence the rate of oxidation is strongly influenced by sulphur particle size.

Two physical attributes of fertilizer products that have a substantial effect on oxidation rates are the extent of dispersion from the fertilizer granule after it has been introduced on or in the soil and the size of the dispersed sulphur particles, with smaller particles oxidizing more rapidly than larger particles.

In order to provide greater dispersion of the sulphur some elemental sulphur products mix the sulphur with bentonite clay by means of a hot process utilizing molten sulphur during the production stage. Upon application, the clay functions to imbibe water and break apart or disperse the particulate. In actuality the particulates do not readily disperse into finely divided particles and sulphur oxidation proceeds at a very slow rate. This occurs due to molten hydrophobic sulphur coating the clay particles during the production stage preventing contact with water.

Thus, it would be advantageous to have a granular elemental sulphur containing fertilizer which has a high nutrient content and quickly disperses into finely divided particles, say for example sub 30 micron particles, once contacted with water on or in the soil.

Various products and processes have heretofore been proposed. For example, U.S. Pat. No. 4,133,669 relates to a process for pelletizing a mixture of elemental sulphur and bentonite clay to produce a water degradable prill which includes adding dry clay dust to molten sulphur at an elevated temperature to provide a molten sulphur-clay mixture, forming droplets of the mixture, providing a liquid fertilizer coolant at a temperature lower than the freezing temperature of the sulphur-bentonite mixture, feeding the droplets into the coolant, passing the droplets through the coolant for a time sufficient to anneal the droplets into pellets, and removing the annealed pellets from the coolant.

Furthermore, U.S. Pat. No. 4,330,319 relates to a process for the production of a urea sulphur fertilizer by mixing urea and molten sulphur to obtain a molten mixture and solidifying the molten mixture to obtain a homogeneous, solid, particulate urea sulphur fertilizer wherein the sulphur has particle sizes of smaller than about 100 micron. The process comprises passing molten urea and molten sulphur through a mixing device at a temperature above the melting points to produce a finely divided sulphur dispersed in urea with the molten sulphur added in amounts sufficient to produce said urea sulphur fertilizer, maintaining a pressure drop across said mixing device of at least about 200 kPa to form a homogenized melt of urea sulphur, and solidifying said homogenized melt by prilling or agglomeration Moreover, U.S. Pat. No. 4,394,150 teaches particles formed by passing a mixture of molten sulphur and a particulate swelling clay through a plurality of orifices and into an aqueous solution of a water soluble electrolyte salt, maintained at a temperature effective to cool the mixture below its solidification temperature.

Also, U.S. Pat. No. 4,569,859 relates to a process for prilling a mixture of sulphur and bentonite to produce a water-degradable prill by adding dry bentonite in powdered form to molten sulphur at a temperature to provide a molten sulphur-bentonite mixture, forming droplets of the mixture, providing a quenching solution of either sodium chloride, sodium sulphate, potassium chloride or potassium sulphate at a temperature low enough to solidify the sulphur-bentonite mixture.

Yet another particulate sulphur based fertilizer is taught in U.S. Pat. No. 5,571,303 comprising a uniform dispersion of sulphur and at least one member selected from the group consisting of ammonium sulfate, ammonium phosphate and mixtures thereof.

Furthermore, U.S. Pat. No. 5,599,373 relates to a sulphur-based, chemical soil-corrective or conditioner for agricultural use in the form of pellets, said product containing fly sulphur powder, at least 3% by weight of an inert compound selected from the group consisting of clay, bentonite, kaolin and mixtures thereof, and at least 0.5% by weight of a wetting agent.

Other fertilizers, compositions and method of manufacture can be found in U.S. Pat. Nos. 5,599,373, 5,571,303 and 4,330,319.

The present invention alleviates the safety problems associated with handling powdered sulphur and the problem of very slow conversion to sulphate of sulphur bentonite granular sulphur.

SUMMARY OF THE INVENTION

Elemental sulphur pellets are provided that disperse into finely divided particles with more than 10% of said particles less than 50 mesh (US Standard Mesh). The particles include from 10% to 99.9% sulphur. Following application of a described pellet, water is allowed to contact the pellet, dispersing it into pieces and thereby delivering finely divided sulphur particles to oxidizing bacteria for timely conversion to plant available sulphate.

An aspect of this invention relates to a water dispersible pellet comprising: micronized elemental sulphur where 80% of the particles are less than 30 microns in size, which disperse into particles upon contact with water.

Another aspect of this invention relates to a water dispersible pellet comprising: micronized sulphur; at least one of a binder and a surfactant; bentonite clay; and a soluble compound providing cations and anions in a moist environment.

Still a further aspect of this invention relates to a water dispersible pellet comprising: micronized elemental sulphur with 80% of particles less than 30 microns in diameter; and a binder component present in the amount ranging from 0.05% to 95% by weight of the total dry weight of the pellet; the pellet having a mean particle domain size and a mean crushing strength, all in a form such that within a few minutes of contact with water the pellet disperses into particles with more than 10% of said particles passing through a 50 mesh (US Standard Size) screen.

Yet another aspect of this invention relates to a method of producing a water dispersible pellet comprising: mixing micronized elemental sulphur particles where 80% of the micronized elemental sulphur particles being less than 30 microns in size, with an additive and water at a temperature less than the melting temperature of sulphur to form a mixture having a moisture content; and forming pellets from the mixture.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

General

Figure 1:
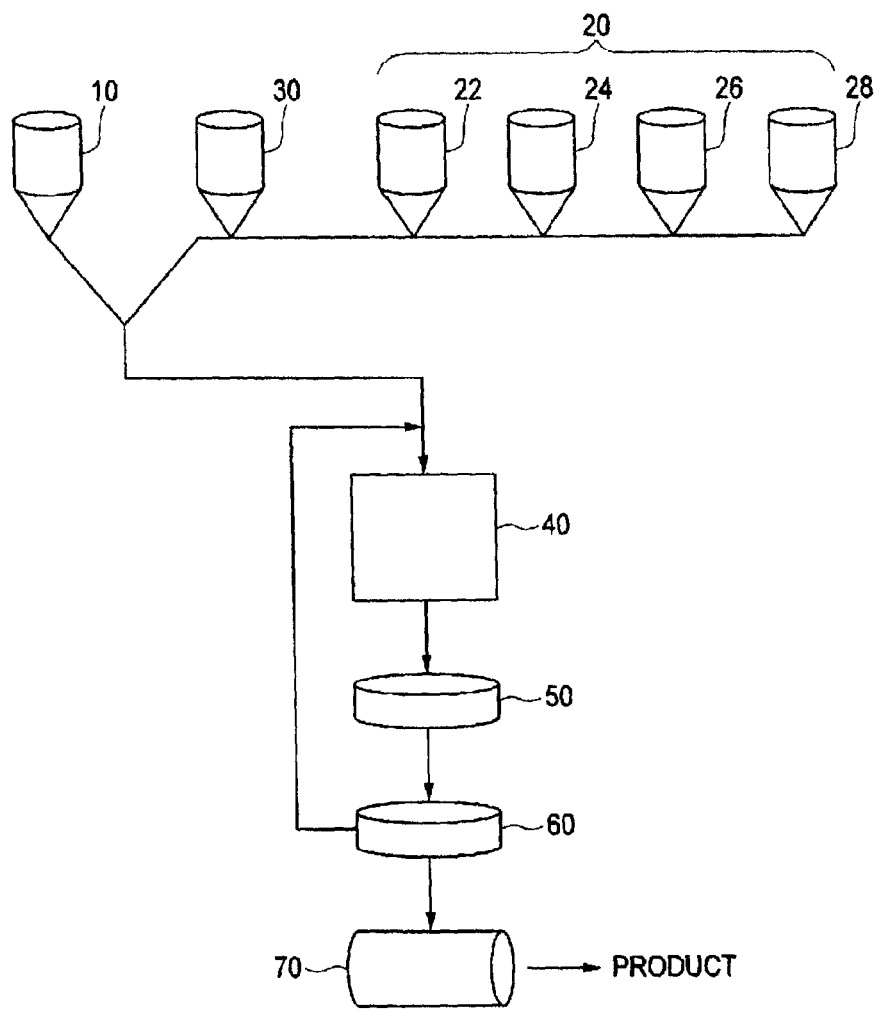
FIG. 1 is a process diagram illustrating a process for forming a water dispersible pellet containing micronized elemental sulphur.

The present invention relates to a method of formulating an elemental sulphur fertilizer pellet with enhanced dispersal properties. The pellet retains its size and shape during handling and application to a desired area. Following application the pellet rapidly disperses on contact with moisture from the treated area itself, from irrigation or from natural precipitation or absorption of moisture from the soil. The dispersion of the pellet allows rapid oxidation of the smaller sulphur particles into plant available sulphate for crop fertility needs. Larger particles oxidize more slowly and provide sulphate throughout the growing season.

The term dispersion in the context of the present invention is intended to mean that the pellet disperses by breaking into numerous smaller finely divided pieces upon contact with water. The ability of the pellet to disperse in water is generally measured in a wet sieve test. The test involves placing 40 grams of the pellets onto a 50 mesh sieve submersed in water at room temperature. The pellets are allowed to imbibe water for 60 seconds then the sieve is gently swirled three revolutions. The pellets are then left soaking for a further 5 minutes at which time the swirling procedure is repeated.

Immediately after the second swirling procedure the sieve is removed from the water and all material remaining on the surface of the sieve is washed onto a pre-weighed filter disc in a Buchner funnel. Excess water is removed from the Buchner funnel using light suction. The filter disc and all remaining material is then transferred to a pre-weighed weigh boat and placed in an oven at 70 degrees C. until fully dried. The weight of the remaining material is determined and the amount of dispersed material is calculated.

Dispersion

In a preferred embodiment, pellets disperse within 6 minutes into particles with more than 5% less than 50 mesh in size. Preferably, pellets disperse within a few minutes into particles with more than 20% less than 50 mesh in size. Even more preferably, pellets disperse within a few minutes into particles with more than 50% less than 50 mesh in size. Most preferably, pellets disperse within a few minutes into particles with more than 90% less than 50 mesh in size.

Elemental Sulphur

By elemental sulphur, we mean sulphur which consists of essentially sulphur, but which can have impurities or trace amounts in the vicinity of 20% or less.

Composition of Pellets

A pellet in the present invention has a micronized sulphur ingredient, a binder component, a surfactant, a soluble compound providing cations and anions and bentonite clay. The micronized sulphur can be produced using a dry milling process, a wet milling process, or an emulsification process such as high speed mixing, use of pressure differentials, etc. In a preferred embodiment the size of the micronized sulphur is 80% less than 30 micron in diameter, Preferably, the size of the micronized sulphur is 80% less then 20 micron in diameter. Even more preferably, the size of the micronized sulphur is 80% less than 10 micron in diameter. Most preferably, the size of the micronized sulphur is 80% less than 5 micron in diameter.

In a preferred embodiment the pellets contain a binder that produces or promotes cohesion of the micronized elemental sulphur. The binder component is present in amounts ranging from 0.05% to 95% by weight of the total dry weight of the pellet. Preferably, the binder component is present in amounts ranging from 0.05% to 50% by weight of the total dry weight of the pellet. More preferably, the binder component is present in amounts ranging from 0.05% to 25% by weight of the total dry weight of the pellet. Most preferably, the binder component is present in amounts ranging from 0.05% to 5% by weight of the total dry weight of the pellet. Examples of suitable binders are carbohydrates such as monosaccharides, disaccharides, oligosaccharides, and polysaccharides; glycolipids; glycoproteins; lipids; proteins; lipoproteins, and combinations and derivations thereof. Specific carbohydrate binders illustratively include arabinose, glucose, fructose, galactose, lactose, maltose, mannose, sucrose, trehalose, xylose, and mixtures thereof such as corn syrup; celluloses such as carboxymethylcellulose, ethylcellulose, hyclroxyethyleellulose, hydroxymethylethylcellulose, hydroxyethylpropylcellulose, methylhydroxyethylcellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocofloids, chitin, gum arable, guar gum, gum karaya, gum tragacanth and locust bean gum; complex organic substances such as lignin and nitrolignin; derivatives of lignin such as lignosulfonate salts illustratively including calcium lignosulfonate, ammonium lignosulfonate and sodium lignosulfonate and complex carbohydrate-based compositions containing organic and inorganic ingredients such as molasses. Suitable protein binders illustratively include soy extract, zein, prolamine, collagen, to and casein. Binders operative herein also include synthetic organic polymers capable of promoting or producing cohesion of micronized sulphur and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In a preferred embodiment, the binder is ammonium lignosulfonate, calcium lignosulfonate, sodium lignosulfonate or a combination thereof.

In another embodiment the pellets contain a surfactant that promotes wetting and dispersion of the micronized elemental sulphur. The surfactant component is present in amounts ranging from 0.05% to 10% by weight of the total dry weight of the pellet. Preferably, the surfactant is present in amounts ranging from 0.05% to 5% by weight of the total dry weight of the pellet. More preferably, the surfactant is present in amounts ranging from 0.05% to 1% by weight of the total dry weight of the pellet. Most preferably, the surfactant is present in amounts ranging from 0.05% to 0.5% by weight of the total dry weight of the pellet. Examples of suitable surfactants are alkylbenzene sulfonates, sodium alpha olefin sulfonate, sodium dioctyl sulfosuccinate, sodium alkylnaphthalenesulfonates, sodium alkylnaphthalenesulfonate condensates, nonyl phenol ethoxylates, carboxylates, and phosphate esters.

In another embodiment the pellets contain a soluble salt that provides anions and cations and promotes dispersion of the micronized elemental sulphur. The soluble salt is present in amounts ranging from 0.05% to 95% by weight of the total dry weight of the pellet. Preferably, the soluble salt is present in amounts ranging from 0.05% to 50% by weight of the total dry weight of the pellet. More preferably, the soluble salt is present in amounts ranging from 0.05% to 25% by weight of the total dry weight of the pellet. Even more preferably, the soluble salt is present in amounts ranging from 0.05% to 10% by weight of the total dry weight of the pellet. Most preferably, the soluble salt is present in amounts ranging from 0.05% to 5% by weight of the total dry weight of the pellet. Specific soluble salts illustratively include but are not limited to, ammonium chloride, ammonium sulfate, calcium chloride, calcium sulfate, iron sulfate, magnesium chloride, magnesium sulphate, potassium chloride, potassium sulfate, and sodium chloride.

In another embodiment the pellets contain bentonite clay that swells when wetted and promotes dispersion of the micronized elemental sulphur. The bentonite clay is present in amounts ranging from 0.05% to 95% by weight of the total dry weight of the pellet. Preferably, the bentonite clay is present in amounts ranging from 0.05% to 50% by weight of the total dry weight of the pellet. More preferably, the bentonite clay is present in amounts ranging from 0.05% to 25% by weight of the total dry weight of the pellet. Even more preferably, the bentonite clay is present in amounts ranging from 0.05% to 10% by weight of the total dry weight of the pellet. Most preferably, the bentonite clay is present in amounts ranging from 0.05% to 5% by weight of the total dry weight of the pellet.

Method of Making Pellets

In a preferred embodiment, micronized elemental sulphur is mixed with the binder, and/or surfactant, and/or soluble salt, and/or bentonite clay. Water is then added to the mixture to provide a moisture content ranging from 5% to 25% on a dry weight basis. In a preferred embodiment the moisture content ranges from 5% to 20% by weight of the total dry weight. In the most preferred embodiment, the moisture content ranges from 5% to 15% by weight of the total dry weight. The mixture is then mechanically aggregated into pellets using a pellet press (pellet mill). Illustrative examples of suitable pellet presses are the Kahl Pellet Mill and the California Pellet Press. Alternatively, the binder can be omitted from the mixing step and agglomeration can be achieved using a pan or drum granulator in the presence of the binder. In this embodiment, the binder is sprayed into the pan or drum granulator with the micronized sulphur mixture. The particles are dried and the resulting particles are size-screened and particles of desired size are stored. Optionally, the particles are transferred to a coating drum for addition of a conditioner material.

Various means of drying the material are available. Preferred methods are fluid bed drying, tray drying, or rotary drum drying, however, other forms of drying equipment may be utilized. The material is placed in a drier and the drier inlet air temperature ranges from about 50 degrees C. to 100 degrees C. More preferably, the to temperature ranges from 60 degrees C. to 70 degrees C. Further methods of drying particles will be apparent to one of skill in the art and illustratively include drying under vacuum conditions or with the use of infra-red heat or micro-waves.

FIG. 1 illustrates a process for producing water dispersible pellets. A supply 10 of micronized elemental sulphur particles is provided where 80% of the sulphur particles are less than 30 microns in size. A number of additive supplies 20 can also be provided, such as a binder supply 22, a surfactant supply 24, a clay supply 26 and a salt supply 28. A water supply 30 can also be provided so that water can be added to the sulphur particles and any other additives for form a mixture having a moisture content.

A mixer 40 is provided to mix the sulphur particles with any of the desired additives and the water to form a mixture having a moisture content ranging from 5% to 25% on a dry weight basis. In a preferred embodiment the moisture content ranges from 5% to 20% by weight of the total dry weight. In the most preferred embodiment, the moisture content ranges from 5% to 15% by weight of the total dry weight.

In one embodiment the sulphur particles can be mixed with a binder in the mixer 40. The binder can be added to the mixer 40 in amounts ranging from 0.05% to 95% by weight of the total dry weight of the resulting mixture. More preferably, the binder can be added to the mixer 40 in amounts ranging from 0.05% to 5% by weight of the total dry weight of the resulting mixture.

In one embodiment the sulphur particles can be mixed with a surfactant in the mixer 40. The surfactant can be added to the mixer 40 in amounts ranging from 0.05% to 10% by weight of the total dry weight of the resulting mixture. More preferably, the surfactant can be added to the mixer 40 in amounts ranging from 0.05% to 0.5% by weight of the total dry weight of the resulting mixture.

In one embodiment the sulphur particles can be mixed with a soluble salt in the mixer. The soluble salt can be added to the mixer 40 in amounts ranging from 0.05% to 95% by weight of the total dry weight of the resulting mixture. More preferably, the soluble salt can be added to the mixer 40 in amounts ranging from 0.05% to 5% by weight of the total dry weight of the resulting mixture.

In one embodiment the sulphur particles can be mixed with bentonite clay in the mixer 40. The bentonite clay can be added to the mixer 40 in amounts ranging from 0.05% to 95% by weight of the total dry weight of the resulting mixture. More preferably, the bentonite clay can be added to the mixer 40 in amounts ranging from 0.05% to 5% by weight of the total dry weight of the resulting mixture.

The mixing of the sulphur particles with additives and the water in the mixer 40 is done at temperatures below the melting point of the sulphur particles. In this manner, the sulphur particles do not form molten sulfur and maintain their size during the forming of the mixture. This causes the sulfur particles in the resulting pellet to continue to have 80% of the particles being less than 30 microns in size in the final pellet.

Once the mixture has been formed in the mixer 40 and contains the desired moisture content, the mixture can be passed to a pellet former 50. The pellet former 50 can be a pellet press (pellet mill), a device that uses agglomeration to form the pellets such as a pan granulator or drum granulator, etc.

The pellets formed using the pellet former 50 can be then passed to a through a screener 60 to screen out undesirably large and/or small pellet. These oversized and/or undersized rejects can be circulated back into the mixer 40.

Pellets that are not removed by the screener 60 can be routed to a dryer 70 to be dried to the final desired moisture content.

Figure 2:
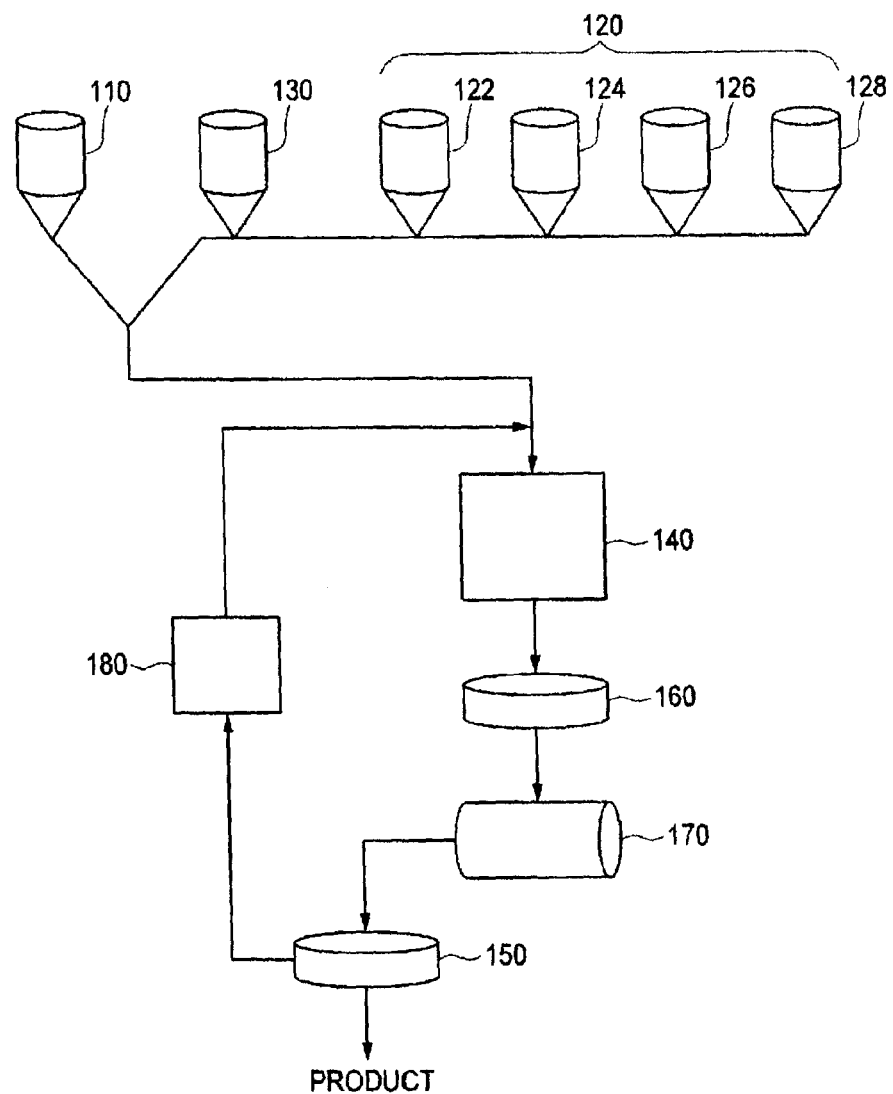
FIG. 2 is a process diagram illustrating an alternate process for forming a water dispersible pellet containing micronized elemental sulphur.

FIG. 1 only illustrates one process that may be used to form water dispersible pellets containing micronized sulphur particles. FIG. 2 illustrates a process in another embodiment. Similar to the process shown in FIG. 1, a supply 110 of micronized sulphur, a water supply 130 and a number of additive supplies 120, such as a binder supply 122, a surfactant supply 124, a clay supply 126 and a salt supply 128 can be provided. Micronized sulphur and the desired additives and water can be supplied to a mixer 140 to form a mixture having the desired amount of sulphur particles, additives and moisture content.

Mixture from the mixer 140 can be passed to a pellet former 160 such as a pellet press or agglomeration device where the mixture is formed into the pellets. The pellets can then be passed to a dryer 170 where the moisture content is reduced to a desirable amount. From the dryer 170, the dried pellets can be passed to a screener 150 to remove oversized and/or undersized pellets. Properly sized pellets can be collected for the final pellet product while oversized and/or undersized pellets can be recycled by passing them to a mill 180 to be broken down before being passed back into the mixer 140.

Pellet Size

The pellets of the present invention have a mean particle domain size that ranges from 0.4 millimeter to 15 millimeters. More preferably, the mean particle domain size ranges from 0.6 millimeter to 10 millimeters. Still more preferably, the mean particle domain size ranges from 0.8 millimeter to 5 millimeters. The pellets formed by the process of the present invention have a Uniformity Index rating in the range of 30 to 95 where the Uniformity Index rating is calculated as the 10th percentile particle size expressed as a percentage of the $95^{th}$ percentile particle size. More preferably, the Uniformity Index rating ranges from 60 to 90.

Pellet Shape

Pellets of the present invention take any shape illustratively including spheres, cylinders, ellipses, rods, cones, discs, needles and irregular. In a preferred embodiment the pellets are approximately spherical.

Pellet Crushing Strength

Pellets of the present invention have a crushing strength that ranges from 1.4 kg per pellet to 8 kg per pellet. Preferably the crushing strength ranges 25

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. Water dispersible pellets comprising:
   micronized elemental sulphur with 80% of particles less than 30 microns in diameter, in an amount ranging from 1% to 99.9% by weight of the total dry weight of the pellets;
   a bentonite clay in the amount ranging from 0.05% to 95% by weight of the total dry weight of the pellets;
   a polysaccharide binder comprising a starch present in the amount ranging from 0.05% to 95% by weight of the total dry weight of the pellets;
   a soluble salt present in the amount ranging from 0.05% to 95% by weight of the total dry weight of the pellet; and
   a lignin sulfonate salt.

2. The pellets of claim 1 wherein the elemental sulphur has been micronized with a process of dry milling, wet milling, or high speed mixing.

3. The pellets of claim 1 wherein the polysaccharide binder is present in an amount ranging from 0.05% to 5% by weight of the total dry weight of the pellets.

4. The pellets of claim 1 further comprising a surfactant in the amount ranging from 0.05% to 10% by weight of the total dry weight of the pellets.

5. The pellets of claim 4 wherein the surfactant ingredient is present in an amount ranging from 0.05% to 0.5% by weight of the total dry weight of the pellets.

6. The pellets of claim 1 wherein the soluble salt ingredient is present in an amount ranging from 0.05% to 5% by weight of the total dry weight of the pellets.

7. The pellets of claim 1 wherein the bentonite clay ingredient is present in an amount ranging from 0.05% to 5% by weight of the total dry weight of the pellets.

8. The pellet of claim 1 wherein the lignin sulfonate salt is one or more of ammonium lignosulfonate, calcium lignosulfonate, or sodium lignosulfonate.

9. The pellet of claim 4 wherein the surfactant ingredient is selected from the group consisting of alkylbenzene sulfonates, sodium alpha olefin sulfonate, sodium dioctyl sulfosuccinate, sodium alkylnaphthalenesulfonates, sodium alkylnaphthalenesulfonate condensates, nonyl phenol ethoxylates, carboxylates, and phosphate esters.

10. The pellet of claim 1 wherein the soluble salt ingredient is selected from the group consisting of: ammonium chloride, ammonium sulfate, calcium chloride, calcium sulfate, iron sulfate, magnesium chloride, magnesium sulfate, potassium chloride, potassium sulfate, and sodium chloride.

11. The pellet of claim 1 wherein the mean particle domain size ranges from 0.4mm to 15 mm.

12. The pellet of claim 1 wherein the mean particle domain size ranges from 0.8mm to 5 mm.

13. The pellet of claim 1 wherein the Uniformity Index ranges from 30 to 95.

14. The pellet of claim 1 wherein the Uniformity Index ranges from 60 to 90.

15. The pellets of claim 1 wherein the mean crushing strength ranges from 1.4 kg per pellets to 8 kg per pellet.

16. The pellets of claim 1 wherein the mean crushing strength ranges from 2.2 kg per pellets to 8 kg per pellet.

17. The pellets of claim 1 wherein the pellets have been produced by using a pellet press, pan granulator or drum granulator.

18. The pellets of claim 1 wherein the pellets have been formed using a pre-pelleting ingredient mixture with a moisture content ranging from 5% to 20% by weight of the total dry weight.

19. The pellets of claim 1 wherein the pellets have been formed using a pre-pelleting ingredient mixture with a moisture content ranging from 10% to 20% by weight of the total dry weight.

20. The pellets of claim 1 wherein the green pellets have been dried at a temperature ranging from 50 degrees C. to 100 degrees C.

21. The pellets of claim 1 wherein the green pellets have been dried at a temperature ranging from 60 degrees C. to 70 degrees C.

22. The pellets of claim 1 wherein the starch comprises a corn starch.

23. A method of producing water dispersible pellets comprising:
mixing micronized elemental sulphur particles wherein 80% of the micronized elemental sulphur particles are less than 30 microns in size, with a bentonite clay, a polysaccharide binder comprising a starch, a soluble salt, a lignin sulfonate salt, and water at a temperature less than the melting temperature of sulphur to form a mixture having a moisture content; and
forming pellets from the mixture.

24. The method of claim 23 further comprising drying the pellets.

25. The method of claim 23 further comprising screening the pellets to obtain pellets having a mean particle domain size ranging from 0.6 to 10 mm.

26. The method of claim 24 further comprising screening the pellets before the pellets are dried.

27. The method of claim 23 wherein the moisture content of the mixture is in the range of 5% to 20% by weight of the total dry weight.

28. The method of claim 27 wherein the moisture content of the mixture is in the range of 5% to 15% by weight of the total dry weight.

29. The method of claim 23 wherein the polysaccharide binder in the mixture is in an amount ranging from 0.05% to 5% by weight of the total dry weight of the mixture.

30. The method of claim 23 wherein the micronized elemental sulfur is further mixed with a surfactant selected from the group consisting of:
alkylbenzene sulfonates, sodium alpha olefin sulfonate, sodium dioctyl sulfosuccinate, sodium alkytnaphthalenesulfonates, sodium alkylnaphthalenesulfonate condensates, nonyl phenol ethoxylates, carboxylates, and phosphate esters.

31. The method of claim 30 wherein the surfactant in the mixture is in an amount ranging from 0.05 to 10% by weight of the total dry weight of the mixture.

32. The method of claim 23 wherein the bentonite clay in the mixture is in an amount ranging from 0.05 to 5% by weight of the total dry weight of the mixture.

33. The method of claim 23 wherein the soluble salt in the mixture is in an amount ranging from 0.05% to 5% by total dry weight of the resulting mixture.

34. The method of claim 23 wherein the sulphur particles are micronized by one of; dry milling; wet milling; or emulsification.

35. The method of claim 23 wherein the pellets are sized from 0.6 to 10millimeters.

36. The method of claim 23 wherein the starch comprises a corn starch.

37. The method of claim 23 wherein the lignin sulfonate salt is one or more of ammonium lignosulfonate, calcium lignosulfonate, or sodium lignosulfonate.

38. The method of claim 23 wherein the pellets are formed from the mixture by using a pellet press, pan granulator or drum granulator.

\* \* \* \* \*